(12) United States Patent
Vanderwalker et al.

(10) Patent No.: US 11,231,017 B2
(45) Date of Patent: Jan. 25, 2022

(54) SYSTEM AND METHOD FOR THE SERVICE AND EXCHANGE OF A YAW BEARING FOR A MACHINE HEAD OF A WIND TURBINE

(71) Applicant: General Electric Company, Schenectady, NY (US)

(72) Inventors: Darrick Adam Vanderwalker, Pattersonville, NY (US); Joshua Adam Klinghagen, Kokomo, IN (US); Gregory Clarence Thomas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 16/369,463

(22) Filed: Mar. 29, 2019

(65) Prior Publication Data
US 2020/0309100 A1    Oct. 1, 2020

(51) Int. Cl.
*F03D 80/50*    (2016.01)
*F03D 13/20*    (2016.01)
*F03D 13/40*    (2016.01)
*F03D 80/70*    (2016.01)

(52) U.S. Cl.
CPC ............. *F03D 80/50* (2016.05); *F03D 13/20* (2016.05); *F03D 13/40* (2016.05); *F03D 80/70* (2016.05); *F05B 2230/80* (2013.01); *F05B 2240/50* (2013.01); *F05B 2260/02* (2013.01)

(58) Field of Classification Search
CPC .......... F03D 13/10; F03D 13/20; F03D 13/40; F03D 80/50; F05B 2230/61; F05B 2230/80; F05B 2260/02
See application file for complete search history.

(56) References Cited

U.S. PATENT DOCUMENTS

| 8,277,184 | B2 | 10/2012 | Nies et al. |
| 8,826,614 | B2 | 9/2014 | Maestre et al. |
| 9,982,659 | B1 | 5/2018 | Leonard |
| 2007/0296220 | A1 | 12/2007 | Kristensen |
| 2008/0040983 | A1 | 2/2008 | Fernandez Gomez et al. |
| 2011/0109106 | A1 | 5/2011 | Inda |

(Continued)

FOREIGN PATENT DOCUMENTS

| EP | 2388480 | 11/2011 |
| EP | 2461021 | 6/2012 |

(Continued)

OTHER PUBLICATIONS

U.S. Appl. No. 15/959,730, filed Apr. 23, 2018.
European Search Report, dated Aug. 12, 2020 for EP Application No. 20165296.3.

*Primary Examiner* — Christopher J Besler
(74) *Attorney, Agent, or Firm* — Dority & Manning, P.A.

(57) ABSTRACT

The present disclosure is directed to a system and methods for the service and exchange of a yaw bearing for a machine head of a wind turbine. The yaw bearing servicing and exchange system has a support stand. The support stand includes a base assembly and at least one support post extending perpendicularly from the base assembly. The support stand also includes at least one first post cap removably coupled to the support post and at least one leveler operably coupled to the at least one first post cap for establishing a level orientation of a support surface with respect to a horizontal plane.

9 Claims, 12 Drawing Sheets

(56) References Cited

U.S. PATENT DOCUMENTS

| | | |
|---|---|---|
| 2011/0140447 A1 | 6/2011 | Paura et al. |
| 2011/0223035 A1 | 9/2011 | Paura et al. |
| 2012/0131876 A1 | 5/2012 | Nies |
| 2013/0180199 A1 | 7/2013 | Vadlamudi et al. |
| 2014/0230343 A1 | 8/2014 | Lam |
| 2015/0027068 A1 | 1/2015 | Sayers et al. |
| 2015/0226179 A1 | 8/2015 | Neumann et al. |
| 2015/0285225 A1 | 10/2015 | Ollgaard |
| 2016/0215762 A1 | 7/2016 | Rohden |
| 2017/0022966 A1 | 1/2017 | Therkildsen |
| 2017/0211547 A1 | 7/2017 | Thomas et al. |
| 2017/0276121 A1* | 9/2017 | Mogensen .............. F03D 80/00 |

FOREIGN PATENT DOCUMENTS

| | | | |
|---|---|---|---|
| EP | 2837818 | 2/2015 | |
| JP | 2002248560 | 9/2002 | |
| WO | WO-2019074364 A1 * | 4/2019 | ............. F03D 13/25 |

* cited by examiner

SYSTEM AND METHOD FOR THE SERVICE AND EXCHANGE OF A YAW BEARING FOR A MACHINE HEAD OF A WIND TURBINE

FIELD

The present disclosure relates in general to wind turbines, and more particularly to systems and methods for servicing and exchanging yaw bearings for a machine head of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To properly orient the rotor blades relative to the direction of the wind, wind turbines typically include one or more yaw drive mechanisms configured to engage a yaw bearing for rotating the machine head or nacelle relative to the tower. During the lifecycle of the wind turbine, it may be necessary to service or replace the yaw bearing. However, the yaw bearing is typically one of the first items installed in the manufacturing process and the installation is often accomplished by inverting the machine head and lowering the yaw bearing into place. Because the assembled machine head generally weighs at least 70 tons, inverting the machine head in the field is impractical. As a result, yaw bearing servicing or exchange using known methods typically involves the transporting of an oversized load to a facility capable of performing the necessary operations, which significantly increases the complexity of the operation.

Additionally, it may, from time to time, be desirable to replace an existing machine head on an existing tower with a different model machine head. To accomplish this repair, a customized yaw bearing may be required to facilitate the coupling of the replacement machine head with the existing tower. It may be desirable to install this customized yaw bearing in the field. However, the same difficulties discussed above exist for this upgraded operation.

In view of the aforementioned, the art is continuously seeking new and improved systems and methods for repairing and/or replacing a yaw bearing in a machine head for a wind turbine in the field.

BRIEF DESCRIPTION

Aspects and advantages of the invention will be set forth in part in the following description, or may be obvious from the description, or may be learned through practice of the invention.

In one aspect, the present disclosure is directed to a yaw bearing servicing and exchange system for a machine head of a wind turbine. The yaw bearing servicing and exchange system includes a support stand. The support stand includes a base assembly and at least one support post extending perpendicularly from the base assembly. The at least one support post has a first post end coupled to the base assembly and an opposing, second post end. The support stand also includes at least one first post cap removably coupled to the second post end. The first post cap(s) defines a first support surface for supporting at least a portion of the yaw bearing. The first support surface defines at least a portion of a first diameter greater than an outside diameter of an inner race of the yaw bearing. The support stand further includes at least one leveler operably coupled to the first post cap(s) for establishing a level orientation of the support surface with respect to a horizontal plane.

In one embodiment, the yaw bearing servicing and exchange system further may include a leveling-lifting assembly for lifting and leveling the machine head. The leveling-lifting assembly may be coupled between a lifting apparatus and a bedplate support frame of the machine head so as to support and level a yaw bearing interface on a level plane relative to the horizontal plane. In certain instances, the yaw bearing may have a deviation from the horizontal plane of less than or equal to 10°. In an additional embodiment, the leveler(s) may include one or more jacking features. In such embodiments, at least one of the jacking features may be oriented so that the first support surface of the first post cap(s) has a deviation from the horizontal plane of less than or equal to 10°.

In another embodiment, the support stand may also include at least one pressure sensor operably coupled to the first post cap(s) so as to detect a weight supported by the first post cap(s). In additional embodiments, the yaw bearing servicing and exchange system may also include a tooling assembly including a support arm and a tooling device. The support arm may include a first end rotatably coupled to the base assembly and an opposing, second end. The second end may include a clamp for supporting the tooling device for affecting the yaw bearing supported by the support stand. In such embodiments, the support arm may be configured to bring the tooling device into contact with the yaw bearing so as to affect the yaw bearing.

In yet another embodiment, the yaw bearing servicing and exchange system may also include at least one second post cap defining a second support surface. The second post cap(s) may define at least a portion of a diameter greater than the outside diameter of the inner race of another yaw bearing. In an additional embodiment, the second post cap(s) may replace the first post cap(s). In further embodiments, the first or second post caps may also include an exchange guide pin coupled to and extending vertically from the first and second support surfaces, respectively. The first or second post caps may also each include a first support portion having a first thickness positioned radially inward of a second support portion having a second thickness. In certain embodiments, the second thickness may be greater than the first thickness.

In further embodiments, the yaw bearing servicing and exchange system may also include a yaw puck retainer system for retaining one or more yaw pucks of the machine head within a bedplate support frame thereof during servicing and exchange of the yaw bearing. In certain embodiments, the base assembly may also include a plurality of base segments.

In another aspect, the present disclosure is directed to a method for servicing or exchanging an existing yaw bearing assembled in a machine head of a wind turbine at a wind turbine site. The method includes positioning a support for the machine head at a working location at the wind turbine site and leveling a support plane defined by the support via a plurality of levelers operably coupled to the support. The method also includes coupling a leveling-lifting assembly to the machine head and leveling, via the leveling-lifting assembly, the machine head in an upright, suspended orientation such that the existing yaw bearing is positioned on a level, horizontal plane. The method further includes positioning the suspended machine head over the support such that the existing yaw bearing is aligned over the support and lowering the machine head onto the support so that at least a portion of the machine head is supported by the support. Moreover, the method includes coupling the existing yaw bearing from the machine head such that the existing yaw bearing rests upon the support. In addition, the method includes lifting, via the leveling-lifting assembly, the machine head from the support such that the existing yaw bearing remains on the support. The method also includes replacing and/or repairing the existing yaw bearing. Further, the method includes aligning the repaired or replaced yaw bearing with the machine head. Additionally, the method includes lowering the machine head onto the repaired or replaced yaw bearing positioned on the support and coupling the repaired or replaced yaw bearing to the machine head.

In one embodiment, the support may be a support stand and replacing and/or repairing the existing yaw bearing may also include removing the existing yaw bearing from the support stand and exchanging at least one first post cap atop at least one support post of the support stand with at least one second post cap. The first post cap(s) defines a first support surface for supporting at least a portion of the existing yaw bearing. The first support surface defines a first diameter greater than an outside diameter of an inner race of the existing yaw bearing. The second post cap(s) defines a second support surface for supporting a different, second yaw bearing. The second support surface defines a second diameter greater than the outside diameter of the inner race of the second yaw bearing. In such embodiments, the outside diameter of the second yaw bearing may be different than the outside diameter of the existing yaw bearing. The method may also include positioning the second yaw bearing atop the second post cap(s) of the support stand.

In another embodiment, leveling, via the leveling-lifting assembly, the machine head in the upright, suspended orientation may also include maintaining a deviation of a level plane of the existing yaw bearing of less than or equal to 10° from the horizontal plane. In additional embodiments, leveling the supporting plane defined by the support via the plurality of levelers operably coupled to the support may also include actuating one or more jacking features and maintaining a deviation of the support plane of the supported stand from the horizontal plane less than or equal to 10°.

In particular embodiments, aligning the repaired and/or replaced yaw bearing with the machine head may further include inserting a plurality of alignment pins of a bedplate support frame of the machine head through corresponding through-holes of at least one of an inner race hole pattern or an outer race hole pattern of the repaired and/or replaced yaw bearing. In additional embodiments, positioning the support for the machine head at the working location at the wind turbine site may also include assembling a base assembly of a support stand from a plurality of base segments.

In at least one embodiment, positioning the support for the machine head at the working location at the wind turbine site may further include positioning the support on a support surface having a loadbearing capacity greater than or equal to a predetermined threshold. In certain embodiments, for example, the predetermined threshold may be greater than or equal to 18,000 kg/m². In an additional embodiment, aligning the repaired and/or replaced yaw bearing with the machine head may also include rotating an inner race of the repaired and/or replaced yaw bearing.

In another aspect, the present disclosure is directed to a method for upgrading an existing machine head of a wind turbine at a wind turbine site. The method includes removing the existing machine head from atop an existing, in situ tower of the wind turbine and positioning a support stand for an upgraded machine head at a working location at the wind turbine site. The method may also include leveling a support plane of the support stand relative to a horizontal plane via at least one leveler operably coupled to the support stand and positioning a first yaw bearing on the support stand. The first yaw bearing is configured to be compatible with a bedplate support frame of the upgraded machine head and with the in situ existing tower. The method may also include coupling a leveling-lifting assembly to the upgrade machine head. Additionally, the method may include positioning the machine head in an upright, suspended orientation over the support stand and aligning the machine head with the yaw bearing, such that a yaw bearing interface portion of the bedplate support frame of the upgraded machine head is level relative to the horizontal plane. The method may further include lowering the upgraded machine head onto the support stand, coupling the first yaw bearing to the upgraded machine head, and installing the upgraded machine head atop the tower of the wind turbine.

In one embodiment, the upgraded machine head may include an existing yaw bearing that is incompatible with the bedplate support frame of the upgraded machine head and with the existing tower. The method may further include aligning the existing yaw bearing within the upgraded machine head atop the support stand before positioning the first yaw bearing on the support stand and decoupling the existing yaw bearing from the machine head. The method may also include lifting the upgraded machine head from the support stand with the existing yaw bearing remaining on the support stand and removing the existing yaw bearing from the support stand. The method may further include exchanging a plurality of first post caps atop a plurality of support posts of the support stand with a plurality of second post caps. The plurality of first post caps each define a first support surface for supporting at least a portion of the existing yaw bearing. Further, the first support surfaces are arranged together to define a first diameter greater than an outside diameter of an inner race of the existing yaw bearing. The plurality of second post caps each define a second support surface for supporting the first yaw bearing. The second support surfaces are arranged together to define a second diameter greater than the outside diameter of the inner race of the first yaw bearing. The outside diameter of the first yaw bearing is different than the outside diameter of the existing yaw bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
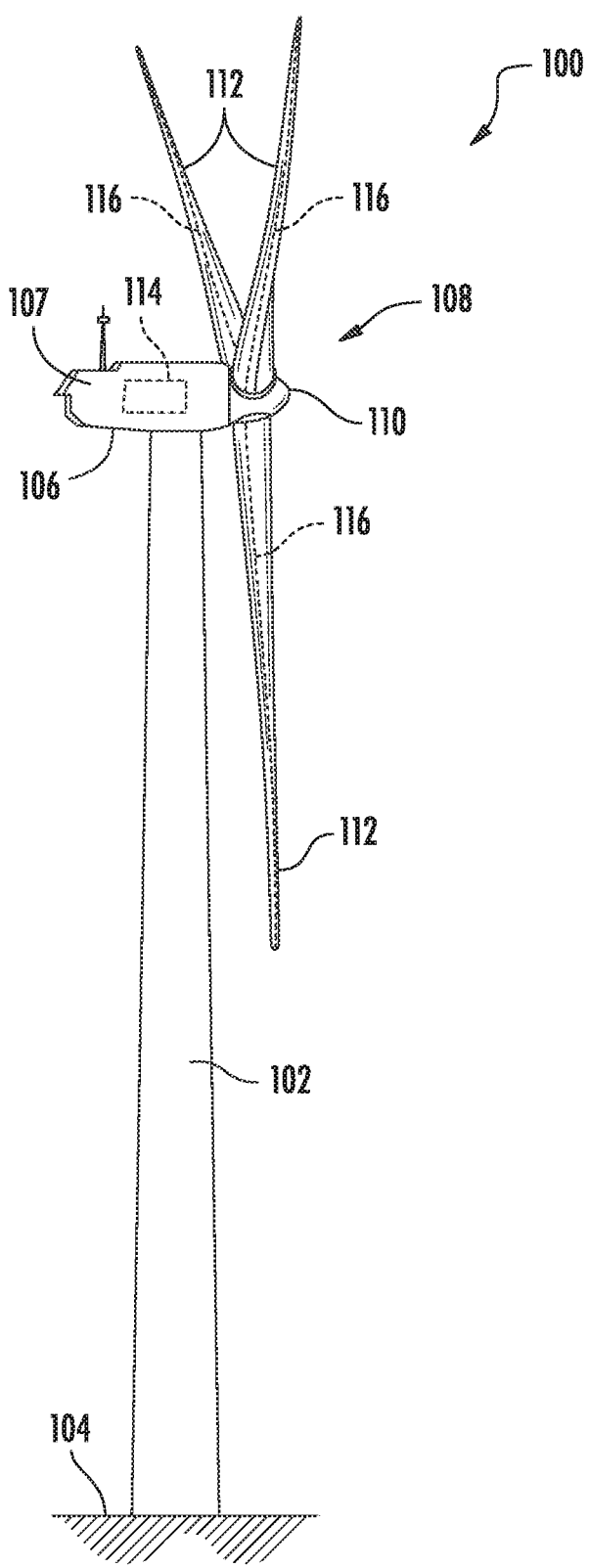
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for servicing or exchanging a yaw bearing for a machine head, or nacelle, of a wind turbine. The system may be employed to exchange a yaw bearing at a wind turbine site without having to invert the machine head or remove the internal components of the machine head, such as the gearbox, the generator, or the controller. The system may include a support stand configured to support the yaw bearing in a level, horizontal orientation. The system may also include a leveling-lifting assembly for lifting and leveling the machine head. In use, the machine head may be placed on the leveled support stand and the fasteners coupling the yaw bearing to the machine head may be removed. The machine head may then be lifted away, in a level configuration, by the leveling-lifting assembly and the yaw bearing repaired or replaced. The machine head may then be lowered onto the yaw bearing supported by the support stand, and the two may be coupled together.

Referring now to the drawings, FIG. 1 illustrates a perspective view of one embodiment of a wind turbine 100 according to the present disclosure. As shown, the wind turbine 100 generally includes a tower 102 extending from a support surface 104, a machine head 106, which includes an outer shell 107, mounted on the tower 102, and a rotor 108 coupled to the machine head 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the outer shell 107 to permit electrical energy to be produced.

The wind turbine 100 may also include a wind turbine controller 114 centralized within the machine head 106. However, in other embodiments, the controller 114 may be located within any other component of the wind turbine 100 or at a location outside the wind turbine. Further, the controller 114 may be communicatively coupled to any number of the components of the wind turbine 100 in order to control the components. As such, the controller 114 may include a computer or other suitable processing unit. Thus, in several embodiments, the controller 114 may include suitable computer-readable instructions that, when implemented, configure the controller 114 to perform various different functions, such as receiving, transmitting and/or executing wind turbine control signals.

Figure 2:
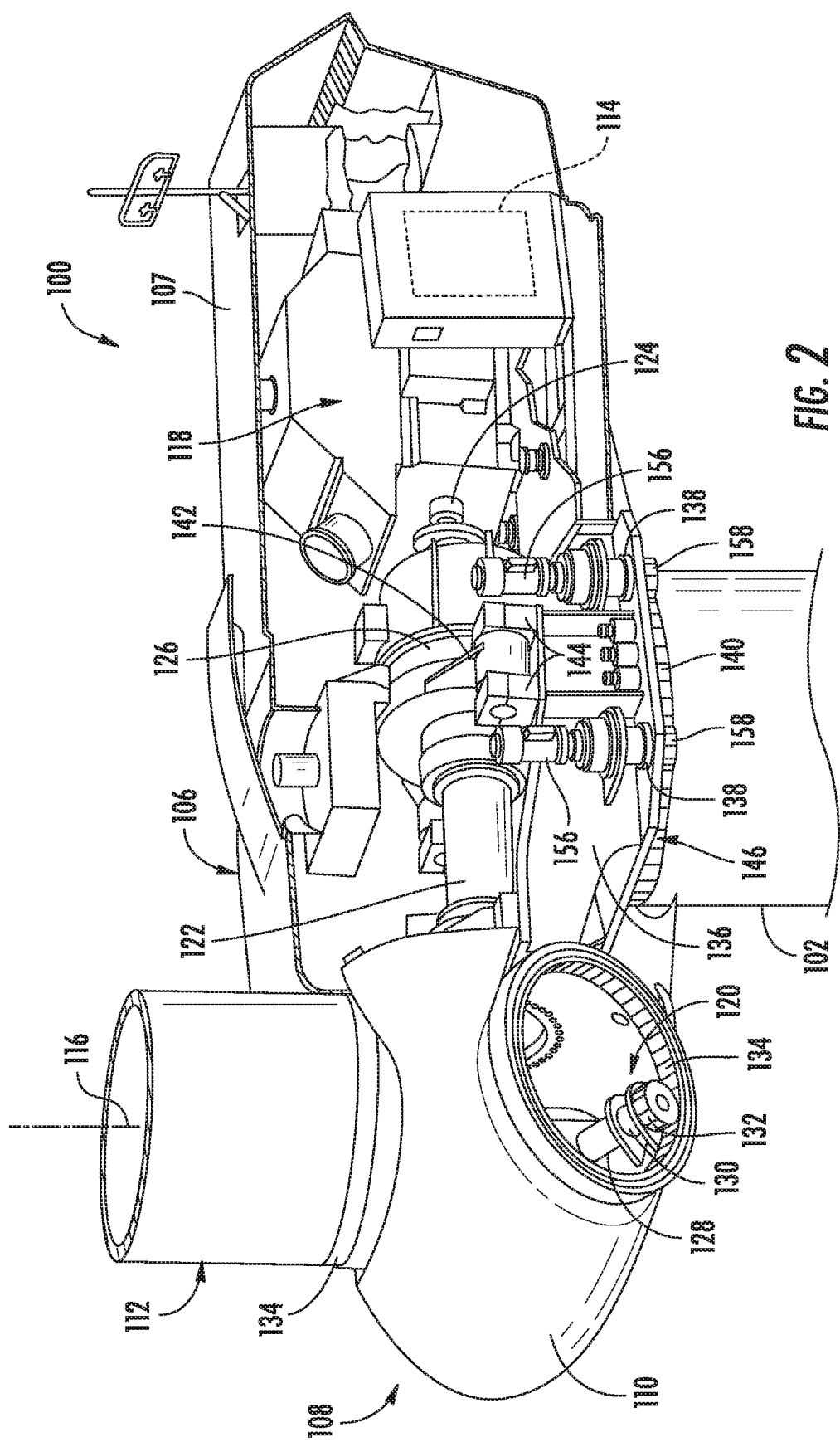
FIG. 2 illustrates a perspective, internal view of one embodiment of a machine head of a wind turbine according to the present disclosure.

Referring now to FIG. 2, a simplified, internal view of one embodiment of the machine head 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may, in turn, be rotatably coupled to a generator shaft 124 of the generator 118 through a gearbox 126 connected to a bedplate support frame 136 by one or more torque arms 142 operably coupled to one or more support elements 144. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116.

Figure 3:
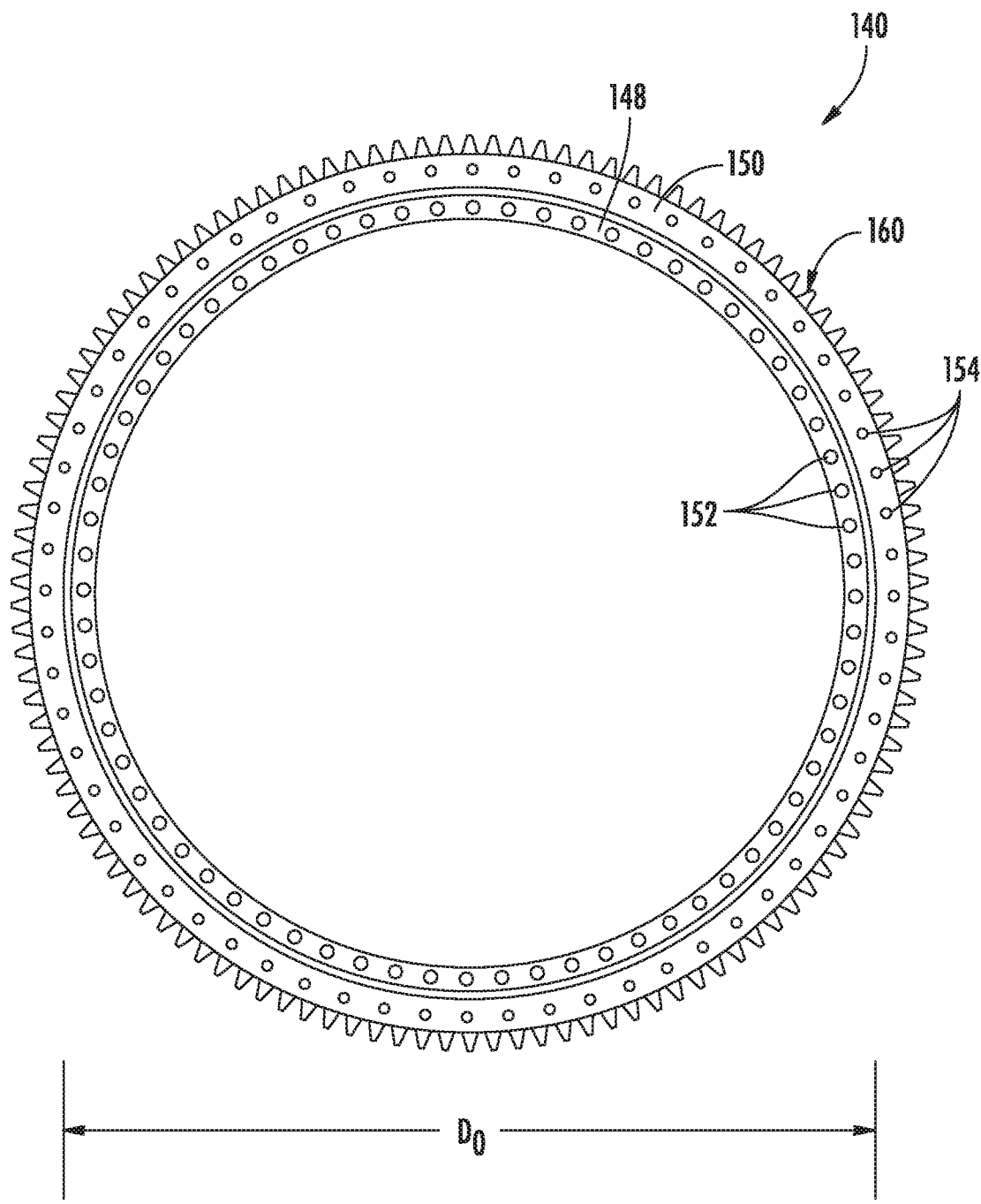
FIG. 3 illustrates a top view of one embodiment of a yaw bearing according to the present disclosure.

The wind turbine 100 may also include one or more yaw drive mechanisms 138 communicatively coupled to the controller 114. Each yaw drive mechanism(s) 138 may be configured to change the angle of the machine head 106 relative to the wind by engaging a yaw bearing 140 of the wind turbine 100. The yaw bearing 140 may couple the tower 102 and machine head 106 at a yaw bearing interface 146. For example, as shown in FIG. 3, the yaw bearing 140 may include an inner race 148 and an outer race 150. As such, the inner race 148 of the yaw bearing 140 may be mounted to the bedplate support frame 136, whereas the outer race 150 of the yaw bearing 140 may be mounted to the tower 102 or vice versa. Mounting may be facilitated through the use of suitable mechanical fasteners, such as nut-bolt combinations, screws, nails, rivets, or other suitable mechanical fastening devices, or through a suitable adhesive, or through a suitable mounting technique such as welding or brazing. In an exemplary embodiment, the inner race 148 may have an inner race hole pattern 152 corresponding to a matching hole pattern in the bedplate support frame 136. Similarly, the outer race 150 may have an outer race hole pattern 154 that corresponds to a matching hole pattern atop the tower 102. In exemplary embodiments, rotation of the yaw bearing 140, such as the rotation of the inner race 148 with respect to the outer race 150, may cause the machine head 106 to rotate with respect to the tower 102.

More specifically, each of the yaw drive mechanisms 138 described herein may include a yaw motor 156 coupled to a yaw gear 158 (e.g., a pinion gear) that is configured to engage the yaw bearing 140 (e.g. one of the outer race 150 or the inner race 148). For instance, the yaw motor 156 may be coupled to the yaw gear 158 directly (e.g., by an output shaft (not shown)) or indirectly through a suitable gear assembly coupled between the yaw motor 156 and the yaw gear 158. As such, the torque generated by the yaw motor 156 may be transmitted through the yaw gear 158 and applied to the yaw bearing 140 to permit the machine head 106 to be rotated about the tower 102. For example, the yaw gear 158 and the outer race 150, as shown, or the inner race 148 may include mating teeth 160, threads, or splines, and mating thereof may provide such engagement and connection as discussed.

It should be appreciated that any suitable bearing may be utilized, according to the present disclosure, as the yaw bearing 140. For example, the yaw bearing 140 may be a plain bearing, a roller bearing, a jewel bearing, a fluid bearing, a magnetic bearing, a flexure bearing, or any other suitable type of bearing. In some exemplary embodiments, such as depicted in FIG. 3, the yaw bearing may be a slewing ring bearing.

Figure 4:
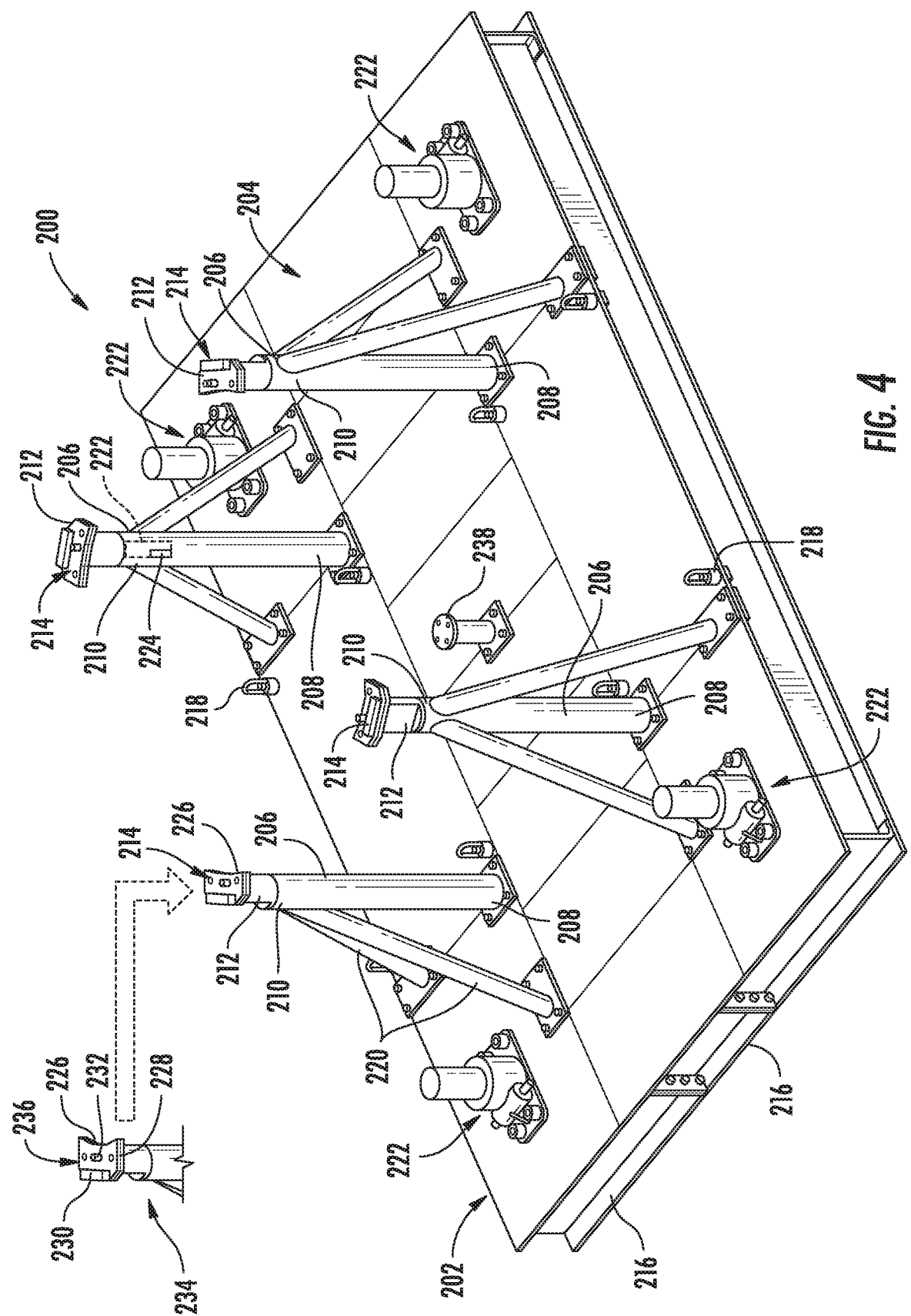
FIG. 4 illustrates a perspective view of one embodiment of a support stand configured to service or exchange a yaw bearing according to the present disclosure.
Figure 7:
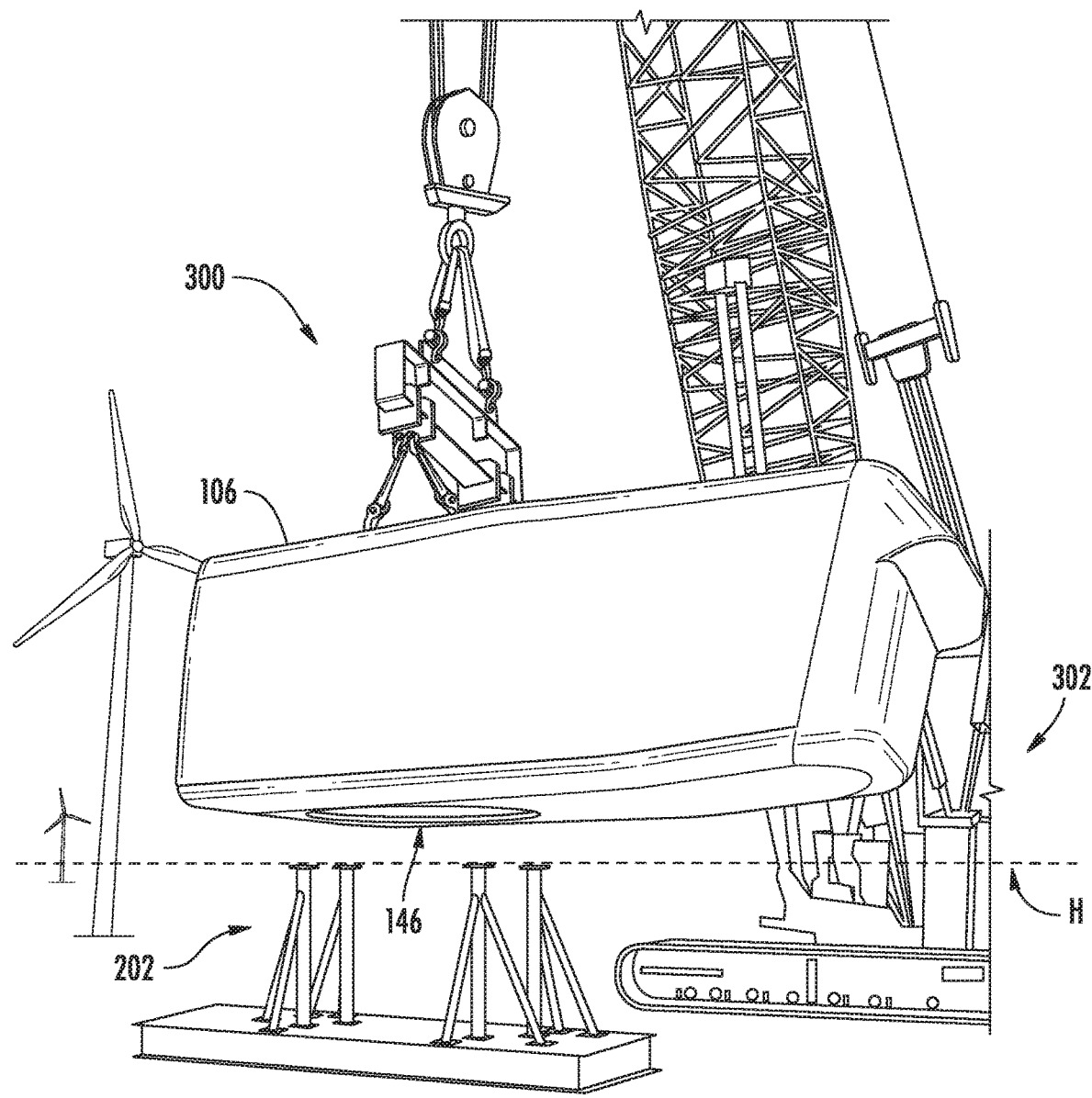
FIG. 7 depicts a perspective view of one embodiment of a machine head supported by the leveling-lifting assembly of FIG. 6 suspended above the support stand of FIG. 4 according to the present disclosure.

Referring now to FIG. 4, a perspective view of a support stand 202 for use with a yaw bearing servicing and exchange system 200 in accordance with an embodiment of the present disclosure is illustrated. As shown, the support stand 202 includes a base assembly 204 and at least one support post 206 extending perpendicularly from the base assembly 204. The support post(s) 206 may have a first post end 208 which is coupled to the base assembly 204, and a second post end 210 at an opposite end thereof. At least one first post cap 212 may be removably coupled to the second post end 210. The first post cap(s) 212 may define a first support surface 214 for supporting at least a portion of the yaw bearing 140. The first support surface 214 may define at least a portion of a first diameter greater than an outside diameter ($D_o$ in FIG. 3) of the inner race 148 of the yaw bearing 140. The support stand 202 may also include at least one leveler 222 which may be operably coupled to the first post cap(s) 212 for establishing a level orientation of the support surface 214 with respect to a horizontal plane (H) (FIG. 7). It should be appreciated that employing the disclosed support stand 202 in the yaw bearing servicing and exchange system 200, as opposed to a temporary blocking or scaffolding, may increase the speed, repeatability, and safety of a yaw bearing servicing and exchange operations. However, it should also be appreciated that the methods disclosed herein may be practiced with any support, including temporary blocking, scaffolding, or an excavation.

Referring still to FIG. 4, in at least one embodiment, the base assembly 202 may also include a plurality of base segments 216 which may be coupled together at a wind turbine site. Further, the base assembly 204 may be outfitted with a plurality of lifting points 218 so as to enable the transport of the fully assembled support stand 202 from a first location at the wind turbine site to a second location at the wind turbine site. The base assembly 204 may be constructed from any suitable material, such as tool steel, capable of creating a structure rated to withstand a static load of at least 63,500 kilograms (kg). For example, the structure may be rated to withstand at least 68,040 kg. Additionally, the structure may be rated to withstand less than or equal to 200,000 kg. The length and the width of the base assembly 204 may be selected so as to support an assembled machine head 106 without tipping. For example, in an embodiment wherein the support stand 202 is configured to support a 1 MW-class machine head, the base assembly 204 may have an assembled length of between greater than 5 meters (m) and less than 6 m. Additionally, the base assembly 204 may have an assembled width of between greater than 3 m and less than 4 m. In order to support the assembled machine head 106 without tipping, the support stand 202 may be positioned on a support surface having a predetermined loadbearing capacity of greater than or equal to 17,088.5 kg/m$^2$ (e.g., between greater than or equal to 18,000 kg/m$^2$ and 390,600 kg/m$^2$). It should be appreciated that the support surface may include, for example, compacted soil, crane mats, concrete, metal plates, other site preparations, or combinations thereof.

Still referring to FIG. 4, the support stand 202 may include a plurality of bracing elements 220 supporting the support post(s) 206. The support post(s) 206, like the base assembly 204 may be constructed from any suitable material, such as tool steel, so that the support post(s) 206 may be capable of withstanding a static load of at least 63,500 kg (e.g., between greater than or equal to 68,040 kg and less than or equal to 200,000 kg). In various embodiments, the support stand 202 may include a plurality of support posts 206. For example, as shown in FIG. 4, the support stand 202 may include four support posts 206 separated by a 90° arc. In an alternative embodiment, a lesser number of support posts 206 may be employed. For example, the support stand 202 may include three support posts 206 separated by an arc of 120°, two support posts 206 separated by 180°, or even a single support post 206. In still further embodiments, more than four support posts 206 may be included so as to sufficiently support an assembled machine head 106. In addition, the support posts 206 may be arranged in any suitable configuration so as to support the machine head 106. It should be appreciated that alternative embodiments in accordance with aspects of the present disclosure are not limited to support posts 206 of equal diameters or equal distributions and may employ such combinations of support post numbers, diameters, and distributions as may be needed to safely support a fully assembled machine head 106.

Figure 5:
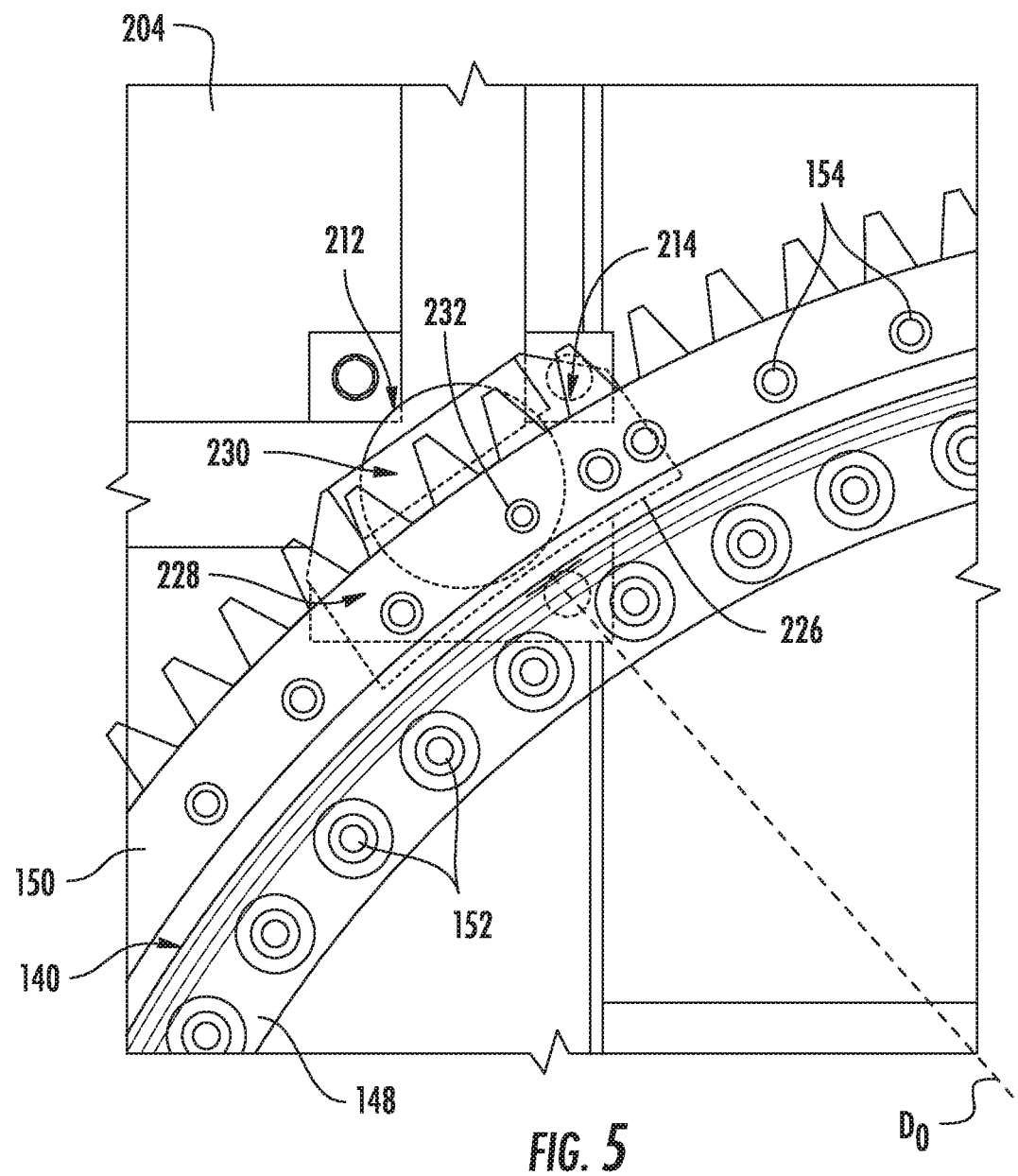
FIG. 5 illustrates a top view of one embodiment of a post cap supporting a portion of a yaw bearing according to the present disclosure.

Referring now to FIG. 5, a top view of one of the first post cap(s) 212 is illustrated supporting a portion of the yaw bearing 140 according to the present disclosure. As depicted in FIGS. 4 and 5, the first post cap(s) 212 may be coupled to the second post end 210 of the support post(s) 206. The first post cap(s) 212 may define the first support surface 214, which may lie on the horizontal plane (H). The first post cap(s) 212 may have a conforming edge 226 which may define a portion of a diameter greater than the outside diameter ($D_o$) of the inner race 148. For example, the portion of the diameter defined by the conforming edge 226 may be between 1 millimeter (mm) and 10 mm (e.g., between greater than or equal to 2 mm and less than or equal to 8 mm) greater than the outside diameter ($D_o$) of the inner race 148. In at least one embodiment, the first post cap(s) 212 may have a first support portion 228 which may have a first thickness ($T_1$). The first post cap(s) 212 may also have a second support portion 230 which may have a second thickness ($T_2$). The second thickness ($T_2$) may be greater than the first thickness ($T_1$). The difference between the second thickness ($T_2$) and the first thickness ($T_1$) may be selected so that the first support portion 228 contacts a portion of the outer race 150 defining the outer race hole pattern 154, while the second support portion 230 contacts a portion of the yaw bearing teeth 160. In an additional embodiment, the first post cap(s) 212 may include at least one exchange guide pin 232 coupled to and extending vertically from the support surface 214. The guide pin(s) 232 may be positioned to be received by the outer race hole pattern 154 of the yaw bearing 140. In an embodiment wherein the support stand 202 is configured with a plurality of support posts 206, at least two first post caps 212 may be equipped with the guide pins 232, while the remaining first post caps 212 may not include the guide pin(s) 232.

Referring again to FIG. 4, in at least one embodiment, the yaw bearing servicing and exchange system 200 may also include at least one second post cap 234. The second post cap(s) 234 may define a second support surface 236. The second post cap(s) 234 may be coupled to the second post end 210 of the support post(s) 206. The second post cap(s) 234 may have a conforming edge 226 which may define a portion of a diameter greater than the outside diameter ($D_o$) of the inner race 148 of a different yaw bearing 140 then the yaw bearing supported by the first post cap(s) 212. For example, the portion of the diameter defined by the conforming edge 226 may be between 1 mm and 10 mm (e.g., between greater than or equal to 2 mm and less than or equal to 8 mm) greater than the outside diameter ($D_o$) of the inner race 148 of another yaw bearing 140. In another embodiment, the second post cap(s) 234 may have a first support portion 228 which may have a first thickness ($T_1$). The first post cap(s) 212 may also have a second support portion 230 which may have a second thickness ($T_2$) that is greater than the first thickness ($T_1$). The difference between the second thickness ($T_2$) and the first thickness ($T_1$) may be selected so that the first support portion 228 contacts a portion of the outer race 150 defining the outer race hole pattern 154 of another yaw bearing 140, while the second support portion 230 contacts a portion of the yaw bearing teeth 160. In additional embodiments, the second post cap(s) 234 may include at least one exchange guide pin 232 coupled to and extending vertically from the support surface 214. The guide pin(s) 232 may be positioned to be received by outer race hole pattern 154 of another yaw bearing 140. In an embodiment wherein the support stand 202 is configured with a plurality of support posts 206, at least two second post caps 234 may be equipped with the guide pins 232, while the remaining second post caps 234 may not include the guide pin(s) 232.

In a further embodiment, the second post cap(s) 234 may replace the first post cap(s) 212. In such embodiments, the first post cap(s) 212 may be configured to support an existing yaw bearing 140, while the second post cap(s) 234 may be configured to support a different, second yaw bearing 140. For example, the support stand 202 may be configured with the first post cap(s) 212 so as to facilitate the removal of an existing yaw bearing 140 from a machine head 106. Following the removal of the existing yaw bearing 140 from the machine head 106, the existing yaw bearing 140 may be removed and the first post cap(s) 212 may be decoupled from the support stand 202. The first post cap(s) 212 may be swapped with the second post cap(s) 234, which are configured to support a different, second yaw bearing 140. With the second post cap(s) 234 being coupled to the support stand 202, the support stand 202 may be configured to support the different, second yaw bearing 140. The second yaw bearing 140 may be placed on the support surface 236 of the second post cap(s) 234 so as to facilitate installation into the machine head 106.

Referring still to FIG. 4, it should be appreciated that the horizontal dimensions of the first post cap(s) 212 and the second post cap(s) 234 may be determined, at least in part, by the number of support posts 206 coupled to the base assembly 204. It should further be appreciated when a lower number of support posts 206 are coupled to the base assembly 204, it may be desirable to increase the horizontal dimensions of the first post cap(s) 212 and the second post cap(s) 234 so as to support the machine head 106. For example, in an embodiment wherein a single support post 206 is coupled to the base assembly 204, it may be desirable for the post cap 212, 234 define a greater portion of the diameter greater than the outside diameter ($D_o$) of the inner race 148 such that the post cap 212, 234 may define an arc of greater than 45° (e.g., greater than 180°).

As depicted in FIG. 4 and FIG. 7, the support stand 202 may include the leveler(s) 222 configured to establish a support plane defined by the first support surface(s) 214 or the second support surface(s) 236 which has a deviation with respect to a horizontal plane (H) of less than or equal to 10°. For example, the leveler(s) 222 may establish a deviation with respect to the horizontal plane (H) which is less than or equal to 5°, more preferably less than or equal to 1°, still more preferably less than or equal to 0.5°. It should be appreciated that maintaining the support surfaces 214, 236 within the desired degree of level with respect to the horizontal plane (H) may, in conjunction with other aspects of the present disclosure, ensure that the yaw bearing 140 does not bind with the yaw gear 158 during the removal from or insertion into the machine head 106.

Referring still to FIG. 4, the leveler(s) 222 may be a plurality of jacking features coupled to or through the base assembly 204 and to a plurality of bearing plates (not shown) in contact with a ground support structure. For example, the leveler(s) 222 may include a screw jack or a hydraulic jack.

In one embodiment, each of the levelers 222 may be rated to support a predetermined load, e.g. of more than 46,000 kg. In another embodiment, one leveler 222 may be positioned in each corner of the base assembly 204. In alternative embodiments, the leveler(s) 222 may be distributed at other suitable locations around the perimeter of the base assembly 204. Additionally, the leveler(s) 222 may be coupled outside the perimeter of the base assembly 204. It should be appreciated that the length of the leveler(s) 222 extending below the base assembly 204 may establish the support plane within the desired level with respect to the horizontal plane.

It should be appreciated that the bearing plates coupled to the leveler(s) 222 may distribute the supported load of the leveler(s) 222 across a broader contact area and may be sized so as to resist sinking into a surface having a loadbearing capacity of 18,000 kg/m². For example, bearing plates may have a rectangular footprint having a length of between greater than 800 cm and less than 900 cm and a width of between greater than 600 cm and less than 700 cm. In at least one embodiment, the bearing plates may be configured to be supported by cribbing elements. The cribbing elements may be coupled together and coupled to the bearing plates so as to facilitate the relocation of the support stand 202 at the wind turbine 100 site. In still further embodiments, the bearing plates may include a pair of runners coupled between pairs of the levelers 222.

In further embodiments, the leveler(s) 222 may be a height adjustment mechanism integrated with the support post(s) 206. In such a configuration, the leveler(s) 222 may include one or more jacking features configured to raise or lower the post cap(s) 212, 234 in order to establish the support plane within the desired degree of level with respect to the horizontal plane (H). The jacking feature(s) of the leveler(s) 222 may include, for example, a spring, a hydraulic system, a screw jack, a ratcheting system, a lever system, a wedge system, or any other suitable mechanism. It should be appreciated that the support stand 202 may, in certain embodiments, include both the leveler(s) 222 integrated with the support post(s) 206 and the leveler(s) 222 operably coupled to the base assembly 204.

In an additional embodiment, the support stand 202 may include at least one pressure sensor 224 which is operably coupled to the first post cap(s) 212. The pressure sensor(s) 224 may be configured to detect a weight supported by the first post cap(s) 212, and thus the support post(s) 206. In another embodiment, the pressure sensor(s) 224 may be coupled to the support post(s) 206, while in an additional embodiment, the pressure sensor(s) 224 may be coupled to the post cap(s) 212, 234. In further embodiments, a pressure sensor 224 may be integrated with each post cap 212, 234 so as to detect the weight supported by each of the support posts 206. A variance in the detected weight at each of the support posts 206 may be used to identify a required adjustment of the leveler(s) 222. Alternatively, the detected weight may be compared to an anticipated load for each support post 206 when the design of the machine head 106 may be expected to lead to an uneven weight distribution when the yaw bearing interface 146 is maintained on a level plane.

Figure 9:
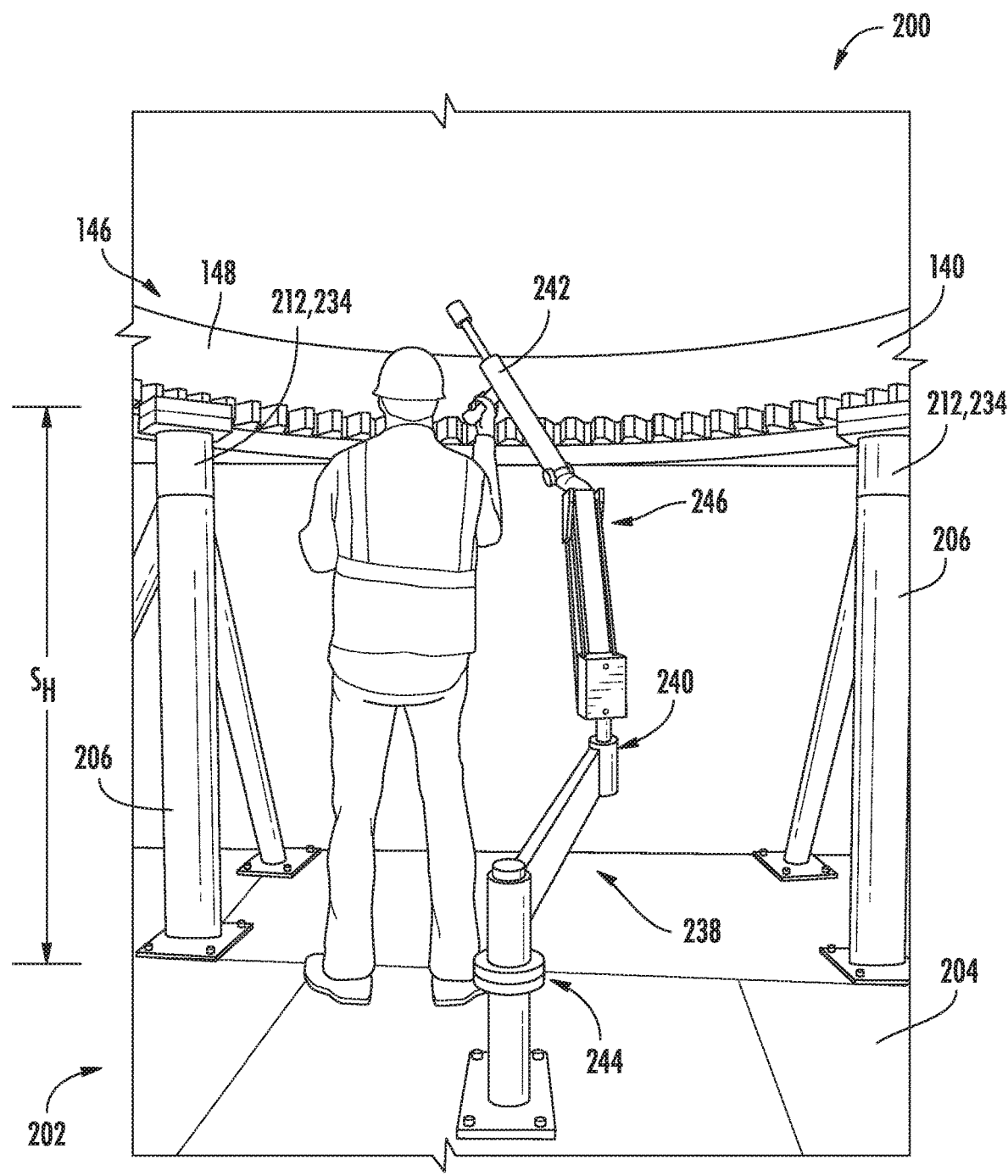
FIG. 9 depicts a perspective view of one embodiment of the machine head supported by the support stand FIG. 4, particularly illustrating a tooling assembly according to the present disclosure.

Still referring to FIG. 4 and also to FIG. 9, the yaw bearing servicing and exchange system 200 may also include a tooling assembly 238. As shown, the tooling assembly 238 may include a support arm 240 and a tooling device 242. The support arm 240 may be configured to support the weight of the tooling device 242. The support arm 240 may include a first end 244 rotatably coupled to the base assembly 204. The support arm 240 may also include an opposing second end 246. The second end 246 may include a clamp (not shown) for supporting the tooling device 242. The tooling device 242 may be any suitable tooling device, such as a torque device, a drill, a grinder, a polisher, or a sander, for affecting the yaw bearing 140 supported by the support stand 202. The support arm 240 may be configured to have a 360° working arc and to bring the tooling device 242 into contact with the yaw bearing 140. It should be appreciated that the tooling assembly 238 may, by supporting the weight of the tooling device 242 during a yaw bearing 140 exchange repair operation, reduce operator fatigue while increasing operator speed and safety.

In additional embodiments, the yaw bearing servicing and exchange system 200, as depicted in FIGS. 4-10, may incorporate a number of safety and ergonomic features. For example, as depicted in FIG. 9, the support post(s) 206 and the post cap(s) 212, 214 may be sized so as to establish a support height ($S_H$) which places the supportive yaw bearing 140 at a recommended average shoulder height of a repair technician. For example, in one embodiment, the support height ($S_H$) may be between greater than 1.3 m and less than 1.7 m from the base assembly 204. Additionally, the support height ($S_H$), in combination with an open arrangement of the support post(s) 206, such as depicted in FIG. 4, may establish a plurality of technician egress routes. Having a plurality of egress routes may enable a technician to work more safely under the machine head 106. In order to reduce the likelihood of the egress routes being utilized, the safety features of the support stand 202 may be further enhanced by sizing the support post(s) 206 and the corresponding bracing elements 220 so as to resist an increased loading due to a seismic event. It should further be appreciated that employing the yaw bearing servicing and exchange system 200 as disclosed herein, may eliminate the requirement to assemble ad hoc structures to support the machine head 106. Because the yaw bearing servicing and exchange system 200 will support each machine head 106 in the same manner, the repeatability, and thus the speed and safety, of the servicing and exchange operations may be increased.

Figure 6:
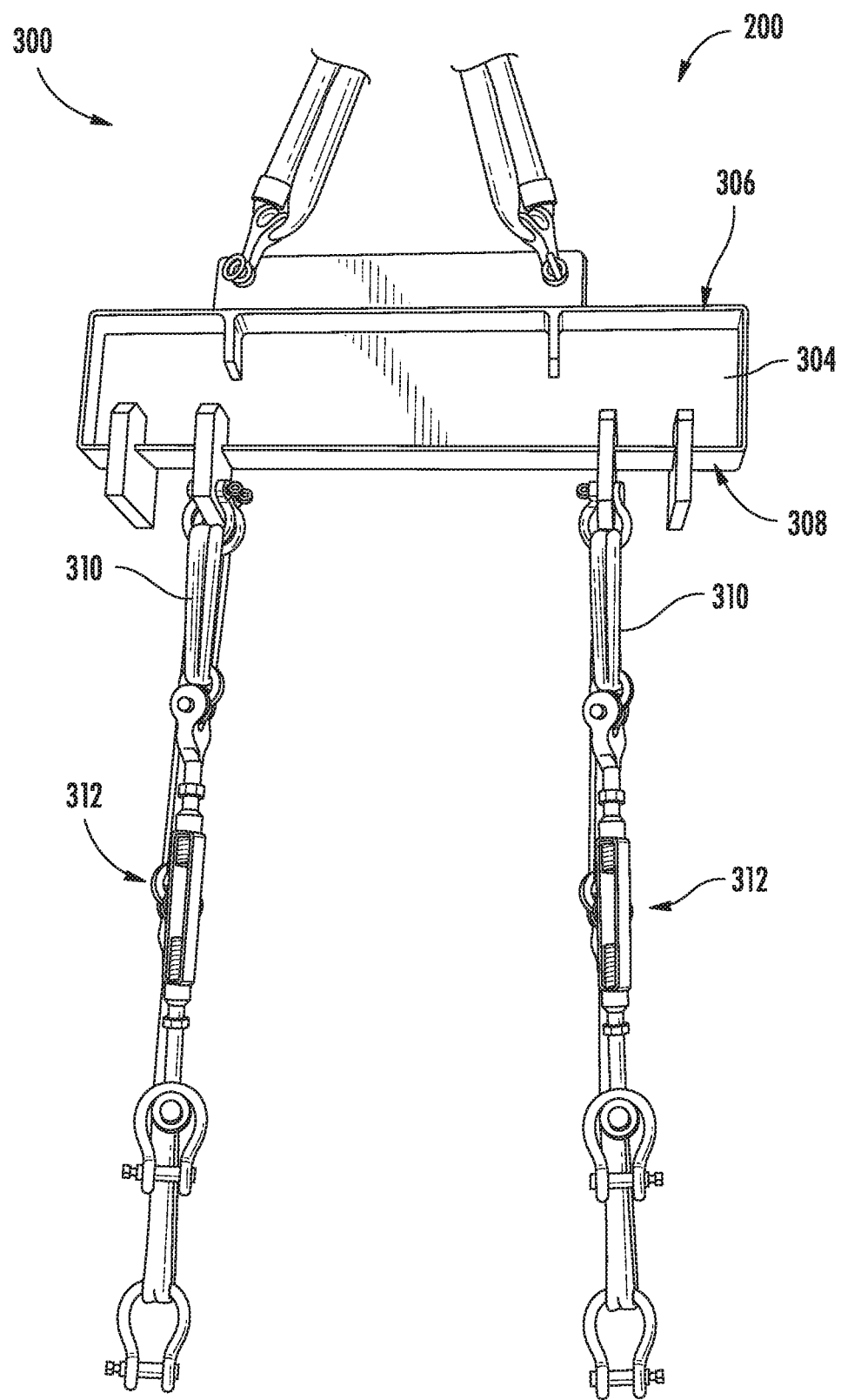
FIG. 6 depicts a front view of one embodiment of a leveling-lifting assembly for lifting and leveling the machine head according to the present disclosure.

FIG. 6 depicts a front view of a leveling-lifting assembly 300 for lifting and leveling the machine head 106 according to aspects of the present disclosure. Also, FIG. 7 depicts a perspective view of a machine head 106 supported by the leveling-lifting assembly 300 of FIG. 6 suspended above the support stand 202 according to aspects of the present disclosure. As a component of the yaw bearing servicing and exchange system 200, the leveling-lifting assembly 300 may be coupled between a lifting apparatus 302 and the bedplate support frame 136 of the machine head 106 so as to support and level the yaw bearing interface 146 on a level plane relative to the horizontal plane. For example, the leveling-lifting assembly 300 may establish a deviation with respect to the horizontal plane (H) which is less than or equal to 10° (e.g., a deviation of less than or equal to 0.5°). It should be appreciated that maintaining the yaw bearing interface 146 within the desired degree of level with respect to the horizontal plane (H) may, in conjunction with other aspects of the present disclosure, ensure that the yaw bearing 140 does not bind with the yaw gear 158 during the removal from or insertion into the machine head 106.

As depicted in FIG. 6, the leveling-lifting assembly 300 may include a lifting beam 304 which may have a beam upper surface 306 operably coupled to the lifting apparatus 302, and a beam lower surface 308. A plurality of lifting straps 310 may be coupled to the beam lower surface 308. At least one tensioning device 312 may be coupled between the lifting straps 310 and the bedplate support frame 136. As such, the tensioning device(s) 312 may be configured to raise or lower a portion of the supported machine head 106 so as to establish the yaw bearing interface 146 on a level plane. The tensioning device(s) 312 may, for example, be a turnbuckle, a winch, a shortening chain, or a clutch. Alternatively, the tensioning device(s) 312 may be integrated into the lifting beam 304 so as to adjust the length of the coupling between the lifting beam 304 and the bedplate support frame 136.

Figure 8:
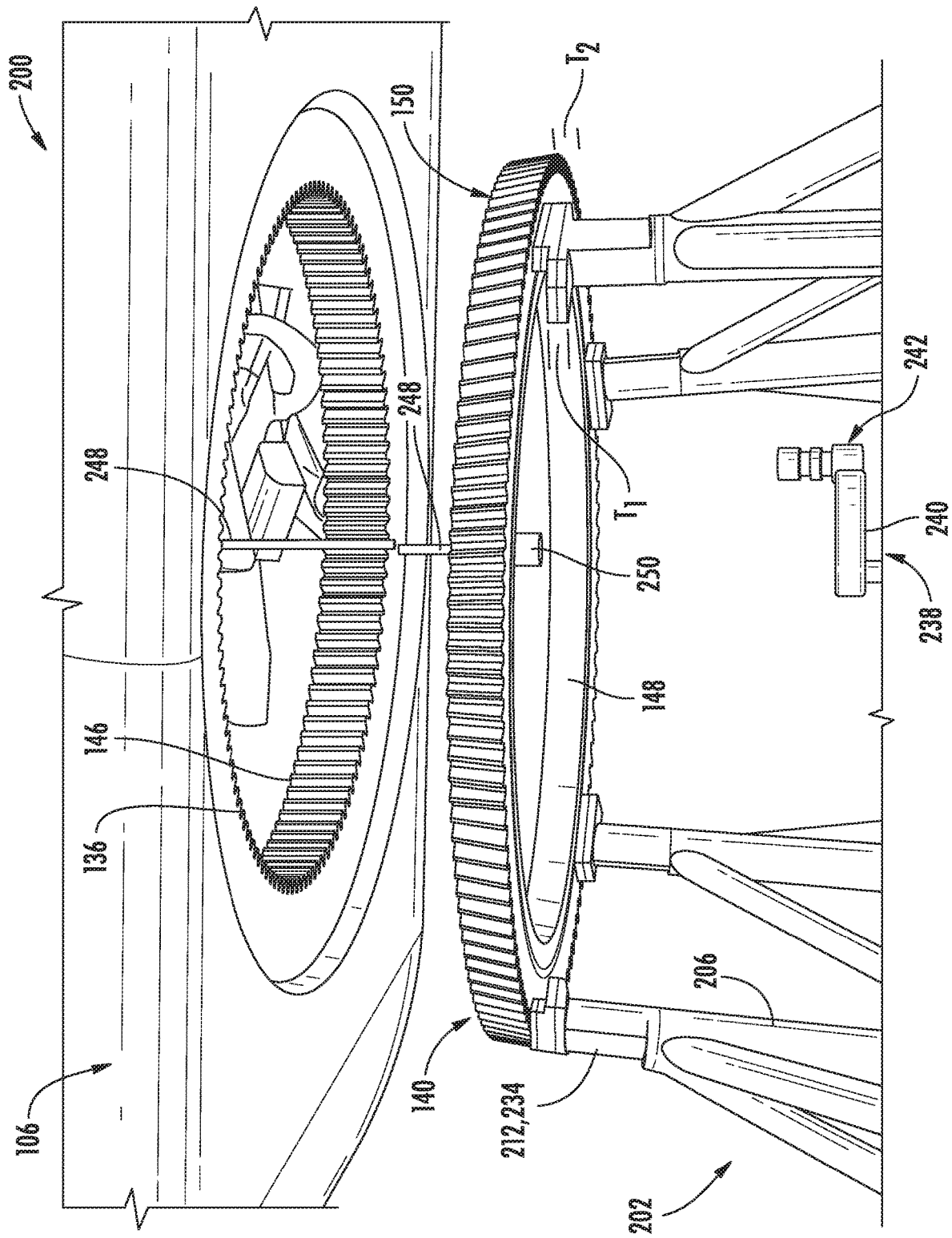
FIG. 8 depicts a perspective view of one embodiment of the machine head suspended above the yaw bearing of FIG. 3 supported by the support stand of FIG. 4 according to the present disclosure.

FIG. 8 depicts a perspective view of the machine head 106 suspended by the leveling-lifting assembly 300 above the yaw bearing 140 supported by the support stand 202. Further, as shown in FIG. 8, a plurality of alignment pins 248 may be coupled to the bedplate support frame 136. Thus, as shown, the plurality of alignment pins 248 may extend below the outer shell 107 and may be configured to be received by the inner race hole pattern 152. The inner race hole pattern 152 may be aligned with the plurality of alignment pins 248 by rotating the inner race 148 of the yaw bearing 140. The inner race 148 may be rotated by coupling a winch or other tensioning device to a portion of the inner race hole pattern 152 and a portion of the support stand 202. In alternative embodiments, an automatic alignment system 250, such as a laser emitter and receiver, may be coupled to the yaw bearing 140 so as to facilitate the alignment of the yaw bearing 140 with the bedplate support frame 136.

Figure 10:
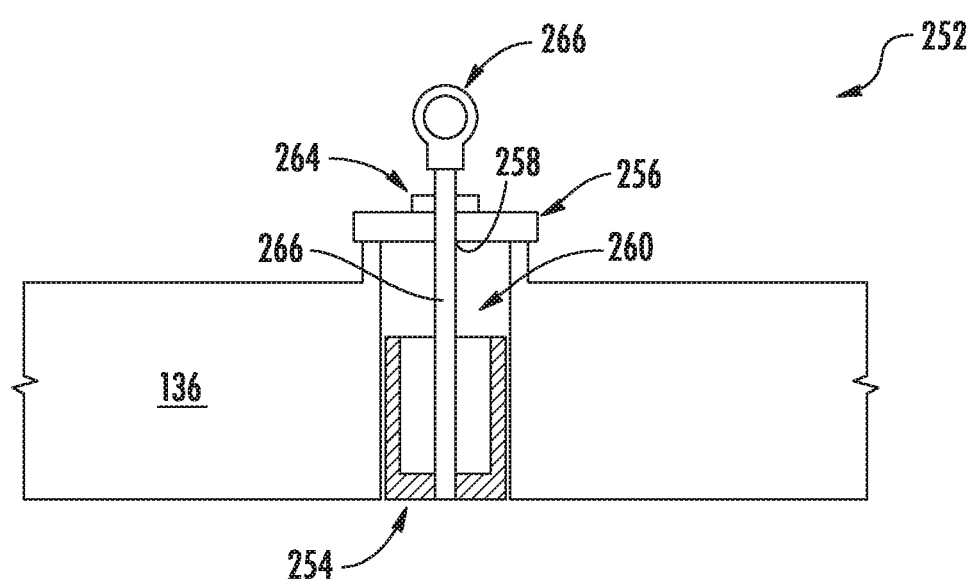
FIG. 10 illustrates a simplified, schematic view of one embodiment of a yaw puck retainer system for use with the machine head of FIG. 2 according to the present disclosure.

FIG. 10 depicts a yaw puck retainer system 252 for use with the machine head 106 according to aspects of the present disclosure. For example, in certain machine heads, a plurality of yaw pucks 254 may be held by the bedplate support frame 136. The plurality of yaw pucks 254 may be configured to affect the friction between the bedplate support frame 136 and the yaw bearing 140. As such, the yaw puck retainer system 252 may be coupled to the yaw pucks 254 so as to secure the yaw pucks 254 in the bedplate support frame 136 as the yaw bearing 140 is removed. More specifically, as shown, the yaw puck retainer system 252 may include a retaining plate 256 defining a center hole 258 and spanning a yaw friction system opening 260 in the bedplate support frame 136. The yaw puck retainer system 252 may also include a retaining rod 262 inserted through the retaining plate 256 and coupled to the yaw puck 254. An adjustable locking apparatus 264 may be coupled to a portion of the retaining rod 262 extending beyond the retaining plate 256 opposite the yaw puck 254. The retaining rod 262 may be further secured by the inclusion of an eye nut 266 coupled to the retaining rod opposite the yaw puck.

Figure 11:
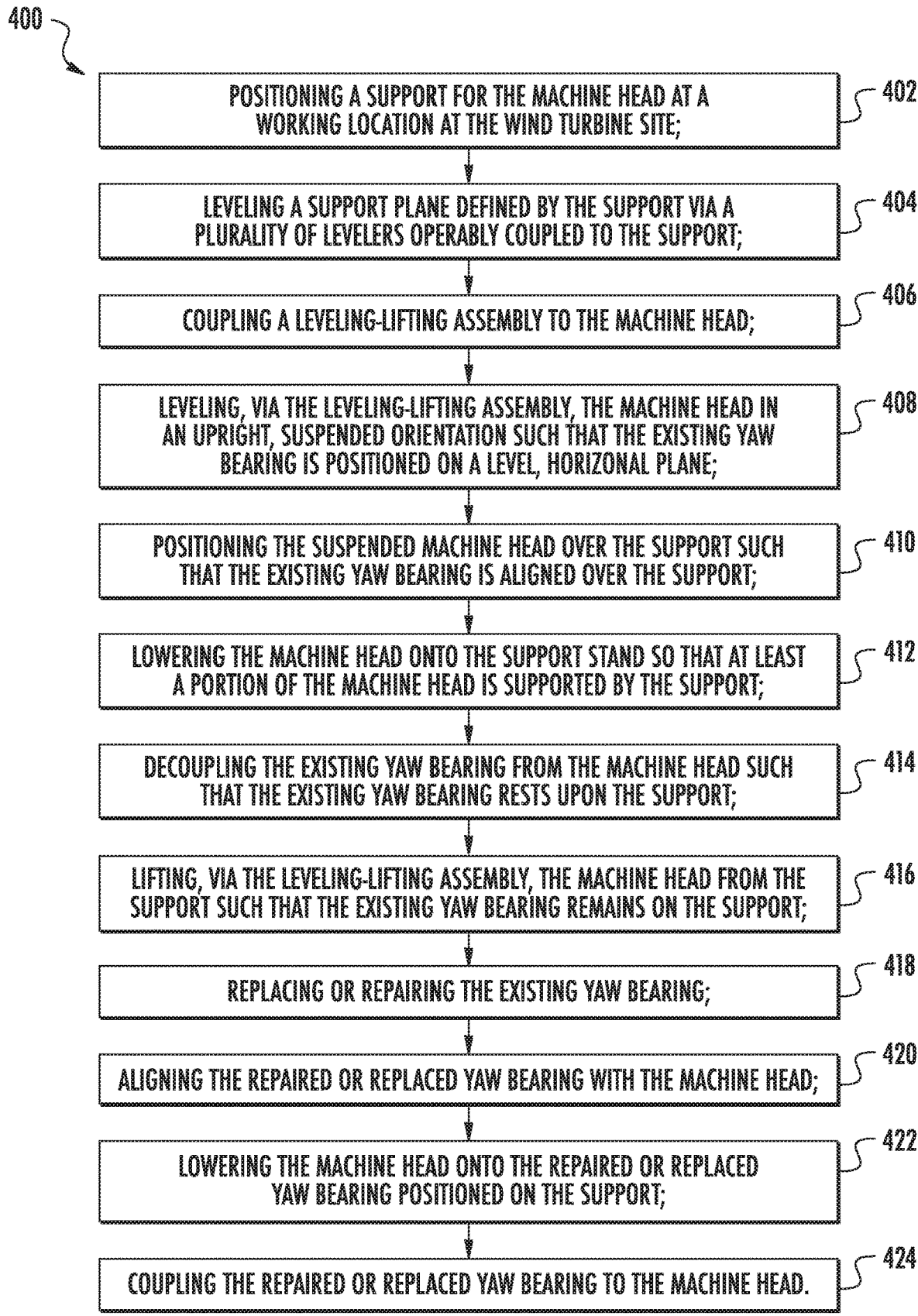
FIG. 11 illustrates a flow diagram of one embodiment of a method for servicing or exchanging an existing yaw bearing assembled in a machine head of a wind turbine at a wind turbine site according to the present disclosure.

Referring to FIG. 11, a flow diagram of one embodiment of a method 400 for servicing or exchanging an existing yaw bearing assembled in a machine head of a wind turbine at a wind turbine site is illustrated. The method 400 may be implemented using, for instance, the yaw bearing servicing and exchange system 200 discussed above with reference to FIGS. 4-10, including the support stand 202 and the leveling-lifting assembly 300. FIG. 11 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

As shown at (402), the method 400 includes positioning a support for the machine head at a working location at the wind turbine site. As shown at (404), the method 400 includes leveling a support plane defined by the support via a plurality of levelers operably coupled to the support. As shown at (406), the method 400 includes coupling a leveling-lifting assembly to the machine head. As shown at (408), the method 400 includes leveling, via the leveling-lifting assembly, the machine head in an upright, suspended orientation such that the existing yaw bearing is positioned on a level, horizontal plane. As shown at (410) and particularly depicted in FIG. 7, the method 400 includes positioning the suspended machine head over the support such that the existing yaw bearing is aligned over the support. As shown at (412) and particularly depicted in FIG. 9, the method 400 includes lowering the machine head onto the support so that at least a portion of the machine head is supported by the support. As shown at (414), the method 400 includes decoupling the existing yaw bearing from the machine head such that the existing yaw bearing rest upon the support. As shown at (416), the method 400 includes lifting, via the leveling-lifting assembly, the machine head from the support such that the existing yaw bearing remains on the support. As shown at (418), the method 400 includes replacing and/or repairing the existing yaw bearing. As shown at (420) and particularly depicted in FIG. 8, the method 400 includes aligning the repaired and/or replaced yaw bearing with the machine head. As shown at (422), the method 400 includes lowering the machine head onto the repaired or replaced yaw bearing positioned on the support. As shown at (424), the method 400 includes coupling the repaired replaced yaw bearing to the machine head.

In an additional embodiment, the support may be a support stand and replacing and/or repairing the existing yaw bearing may also include removing the existing yaw bearing from the support stand. The method 400 may also include exchanging at least one first post cap atop at least one support post of the support stand with at least one second post cap. The method 400 may also include positioning the second yaw bearing atop the at least one second post cap of the support stand.

In an additional embodiment, leveling, via the leveling-lifting assembly machine head 106 in the upright, suspended orientation may also include maintaining a deviation of a level plane of the existing yaw bearing of less than or equal to 10° from the horizontal plane. In another embodiment, leveling the support plane defined by the support via the plurality of levelers operably coupled to the support may also include actuating at least one or more jacking features and maintaining a deviation of the support plane of the support from the horizontal plane less than or equal to 10°.

In still further embodiments, aligning the repaired and/or replaced yaw bearing with the machine head 106 may include inserting a plurality of alignment pins of the bedplate support frame of the machine head 106 through corresponding through-holes of at least one of an inner race hole pattern or an outer race hole pattern of the repaired and/or replaced yaw bearing. In additional embodiments, aligning the repaired and/or replaced yaw bearing with the machine head 106 may also include rotating an inner race of the repaired or replaced yaw bearing.

In yet another embodiment, positioning the support for the machine head 106 at the working location at the wind turbine site may also include positioning the support on a support surface having a loadbearing capacity greater than or equal to a predetermined threshold.

Figure 12:
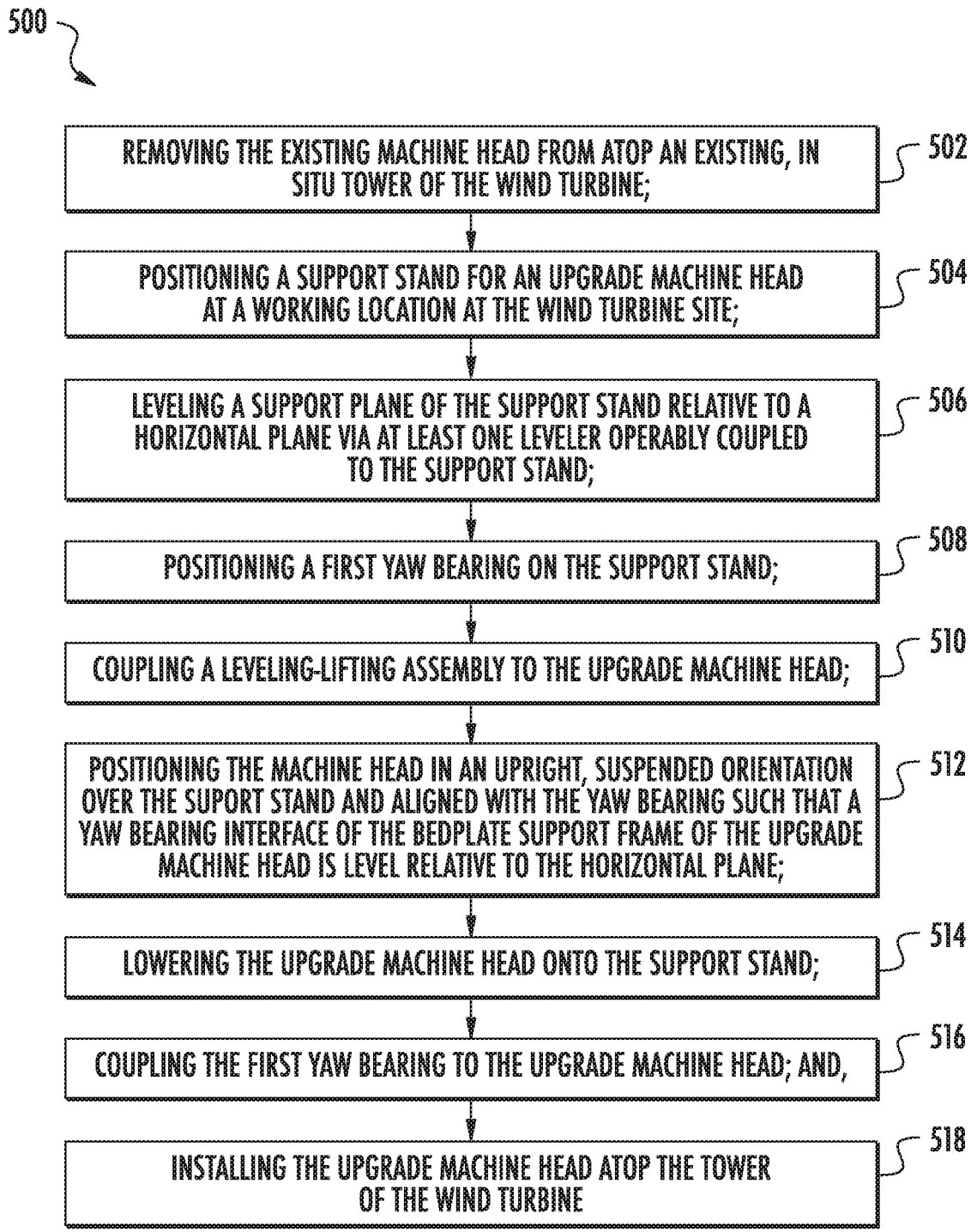
FIG. 12 illustrates a flow diagram of one embodiment of a method for upgrading an existing machine head of a wind turbine at a wind turbine site according the present disclosure.

Referring to FIG. 12, a flow diagram of one embodiment of a method 500 for upgrading an existing machine head of a wind turbine at a wind turbine site is illustrated. The method 500 may be implemented using, for instance, the yaw bearing servicing and exchange system 200 discussed above with reference to FIGS. 4-10, including the support stand 202 and the leveling-lifting assembly 300. FIG. 12 depicts steps performed in a particular order for purposes of illustration and discussion. Those of ordinary skill in the art, using the disclosures provided herein, will understand that various steps of the method 500 or any of the other methods disclosed herein may be adapted, modified, rearranged, performed simultaneously or modified in various ways without deviating from the scope of the present disclosure.

As shown at (502), the method 500 includes removing the existing machine head from atop an existing, in situ tower of the wind turbine. As shown at (504), the method 500 includes positioning a support stand for the upgraded machine head at a working location at the wind turbine site. As shown at (506), the method 500 includes leveling a support plane of the support stand relative to a horizontal plane via at least one leveler operably coupled to the support stand. As shown at (508), the method 500 includes positioning a first yaw bearing on the support stand. The first yaw bearing may be configured to be compatible with a bedplate support frame of the upgraded machine head and with the in situ existing tower. As shown at (510), the method 500 may include coupling a leveling-lifting assembly to the upgraded machine head. As shown at (512), the method 500 may include positioning the machine head in an upright, suspended orientation over the support stand and aligned with the yaw bearing such that a yaw bearing interface portion of the bedplate support frame of the upgraded machine head is level relative to the horizontal plane. As shown at (514), the method 500 may include lowering the upgraded machine head onto the support stand. As shown at (516), the method 500 may include coupling the first yaw bearing to the upgraded machine head. As shown at (518), the method 500 may include installing the upgraded machine head atop the tower of the wind turbine.

In additional embodiments, the upgraded machine head may include an existing yaw bearing that is incompatible with the bedplate support frame of the upgraded machine head and with the in situ existing tower. The method 500 may also include aligning the existing yaw bearing with the upgraded machine head atop the support stand before positioning the yaw bearing on the support stand. The method of 500 may further include decoupling the existing yaw bearing from the machine head, lifting the upgraded machine head from the support stand with the existing yaw bearing remaining on the support stand, and removing the existing yaw bearing from the support stand. The method 500 may also include exchanging a plurality of first post caps atop a plurality of support post of the support stand with a plurality of second post caps.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A yaw bearing servicing and exchange system for a wind turbine, comprising:
    a support stand comprising:
        a base assembly configured to be positioned outside a nacelle of the wind turbine between the nacelle and a support surface of the wind turbine;
        at least one support post extending perpendicularly from the base assembly, the at least one support post having a first post end coupled to the base assembly and an opposing, second post end;
        at least one first post cap removably coupled to the second post end, the at least one first post cap defining a first support surface for supporting at least a portion of the yaw bearing, the first support surface defining at least a portion of a first diameter greater than an outside diameter of an inner race of the yaw bearing, the first support surface defining a support plane; and
        at least one leveler operably coupled to at least one first post cap for establishing a level orientation of the support plane with respect to a horizontal plane, the level orientation of the support plane having a deviation from the horizontal plane of less than or equal to five degrees;
    the system further comprising a leveling-lifting assembly for suspending and leveling the nacelle, the leveling-lifting assembly coupled between a lifting apparatus that is configured to be positioned outside the nacelle and configured to be in contact with the support surface of the wind turbine and a bedplate support frame of the nacelle so as to suspend and level a yaw bearing interface on a level plane having a deviation from the horizontal plane of less than or equal to five degrees, the leveling-lifting assembly comprising:
        a lifting beam configured to be positioned outside and above the nacelle and operably coupled to the lifting apparatus,
        a plurality of lifting straps coupled to the lifting beam and suspended therefrom, and
        at least one tensioning device coupled between the plurality of lifting straps and the bedplate support frame.

2. The yaw bearing servicing and exchange system of claim 1, wherein the at least one leveler comprises one or more jacking features.

3. The yaw bearing servicing and exchange system of claim 1, wherein the support stand further comprises at least one pressure sensor operably coupled to the at least one first post cap so as to detect a weight supported by the at least one first post cap.

4. The yaw bearing servicing and exchange system of claim 1, further comprising:
    a tooling assembly comprising a support arm and a tooling device, the support arm comprising a first end rotatably coupled to the base assembly and an opposing, second end, the second end comprising a clamp for supporting the tooling device for affecting the yaw bearing supported by the support stand, wherein the support arm is configured to bring the tooling device into contact with the yaw bearing so as to affect the yaw bearing.

5. The yaw bearing servicing and exchange system of claim 1, further comprising at least one second post cap defining a second support surface, the at least one second post cap defining at least a portion of a diameter greater than an outside diameter of an inner race of an additional yaw bearing.

6. The yaw bearing servicing and exchange system of claim 5, wherein the at least one second post cap replaces the at least one first post cap.

7. The yaw bearing servicing and exchange system of claim 5, wherein the at least one first or second post caps further comprise an exchange guide pin coupled to and extending vertically from the at least one first and second support surfaces, respectively, the at least one first or second post caps further comprising first support portions having a first thickness positioned radially inward of second support portions having a second thickness, wherein the second thickness is greater than the first thickness.

8. The yaw bearing servicing and exchange system of claim 1, further comprising:
   a yaw puck retainer system for retaining one or more yaw pucks of the machine head within a bedplate support frame thereof during servicing and exchange of the yaw bearing.

9. The yaw bearing servicing and exchange system of claim 1, wherein the base assembly further comprises a plurality of base segments.

* * * * *